US005115368A

United States Patent [19]

Smith

[11] Patent Number: 5,115,368

[45] Date of Patent: May 19, 1992

[54] AC POWER STRIP WITH GROUNDED DIGITAL AND GROUND ISOLATED ACCESSORY RECEPTACLES

[76] Inventor: Lawrence C. Smith, 32 Church St., Malverne, N.Y. 11565

[21] Appl. No.: 700,394

[22] Filed: May 15, 1991

[51] Int. Cl.[5] ....................... H02H 9/04; H01R 13/652

[52] U.S. Cl. ....................................... 361/56; 361/111; 439/105; 439/620

[58] Field of Search .......................... 361/111, 118, 56; 439/92, 105, 620, 535

[56] References Cited

U.S. PATENT DOCUMENTS 4,259,705 3/1981 Stifter .................................... 361/56
4,584,622 4/1986 Crosby et al. ........................ 361/56
4,717,350 1/1988 Lax ....................................... 439/620
4,814,941 3/1989 Speet et al. .......................... 361/111

*Primary Examiner*—William H. Beha, Jr.
*Attorney, Agent, or Firm*—Paula T. Basseches

[57] ABSTRACT

A power strip for use in high definition audio and video systems employing a device having a digital switching source is disclosed. The power strip includes a first receptacle for the digital source employing capacitors for shunting to ground high frequency products at the digital receptacle. The strip includes additional receptacles for non-digital devices, the additional receptacles being isolated from the digital receptacle by series inductances and also being isolated from ground.

2 Claims, 1 Drawing Sheet

AC POWER STRIP WITH GROUNDED DIGITAL AND GROUND ISOLATED ACCESSORY RECEPTACLES

BACKGROUND AND FIELD OF THE INVENTION

The present invention is directed to an A C power strip for use with high accuracy audio or video systems which include digital switching apparatus such as a Cd player, DAT recorder or like source incorporating digital switching means.

THE PRIOR ART

It is known that in high accuracy audio systems, for example. the presence of high frequency products even in the megaherz range in the power source for the various system components, such as amplification devices, etc., materially degrade the quality of sound reproduction, including particularly the image, openness and spacial presentation of the reproduced sound.

The high frequency products, while inaudible in themselves, modulate frequencies in the sonic range with the deleterious effects noted.

In order to minimize the sound degradation of products in the A C lines it is conventional to employ devices which "clean" the mains voltages. A conventional such device includes a power strip having a capacitance between each of the live and neutral A C leads and the ground lead and, in addition, a series inductance between each of the live and neutral leads and the live and neutral contacts of the respective receptacles of the power strip. In such devices the ground contact of each receptacle is connected to the ground lead of the A C mains.

SUMMARY OF THE INVENTION

The present invention may be summarized as directed to an improved power strip adapted particularly for use in high definition audio and video systems wherein a source having a digital switching circuit, such as a Cd or a laser read video deck player or DAT recorder is employed.

Central to the improvement of the instant power strip is the recognition that the digital source itself injects into the mains, high frequency products which degrade the accuracy of reproduction of the audio and video components reproduced by the loud speaker and/or TV device.

In conventional filtering power strips such as described above the net effect of the filter circuitry is to increase the degradation injected by the digital device.

The power strip of the invention provides on a single strip a first receptacle for the digital component, providing a low impedance-to-the-ground path for high frequency products of the digital device and interposes between the digital receptacle and remaining receptacles a high impedance path for such high frequency components.

In addition, the non-digital receptacles of the strip are isolated from ground whereby, on a single strip, the non-digital components are isolated to a maximum degree from high frequency products generated by the digital switching mechanism as well as from high frequency products already existing in the mains.

DETAILED DESCRIPTION OF DRAWINGS

Figure 1:
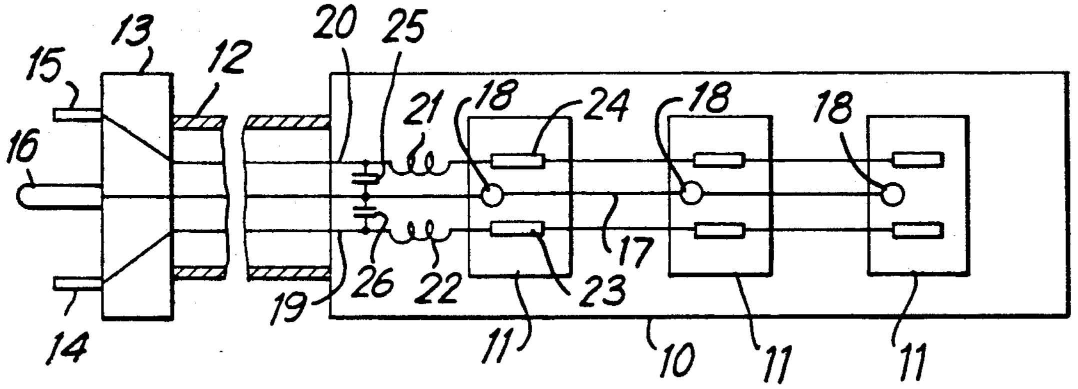
FIG. 1 PRIOR ART
FIG. 1 is a schematic representation of a conventional prior art A C filtering power strip.

In FIG. 1 there is illustrated a conventional power strip intended to filter high frequency products existing in the A C mains.

The device includes a housing 10 on which are mounted a series of receptacles 11 powered by a line cord 12 leading from plug 13. The plug includes a "live" blade 14, neutral blade 15 and grounding contact 16.

Conduit 17 extends from grounding contact 16 to the ground contacts 18 of receptacles 11.

Live contact 19 and neutral conduit 20 are connected by low impedance series inductances 21, 22 to the live and neutral contacts 23, 24, respectively, of receptacles 11.

Capacitors 25 and 26 are interposed between neutral lead 20 and ground lead 17 and between live lead 19 and ground lead 17, respectively.

As will be perceived from the described circuit, the capacitors and inductances effectively filter high frequency products in the mains by shunting such products to ground (capacitors) and by providing a high impedance path between the active leads and the receptacle contacts (inductances).

I have discovered that a significant shortcoming of the conventional strip described is that the large high frequency components injected in the live and neutral contacts 23, 24 by digital switching devices are immediately communicated to the other receptacles via a low impedance path defined by the wires connecting the active contacts of such receptacles.

Importantly, the circuit defines a high impedance path to ground for such high frequency products due to the presence of inductances 21, 22, thus increasing the effect of such system generated products on the devices powered by the other receptacles of the strip.

Figure 2:
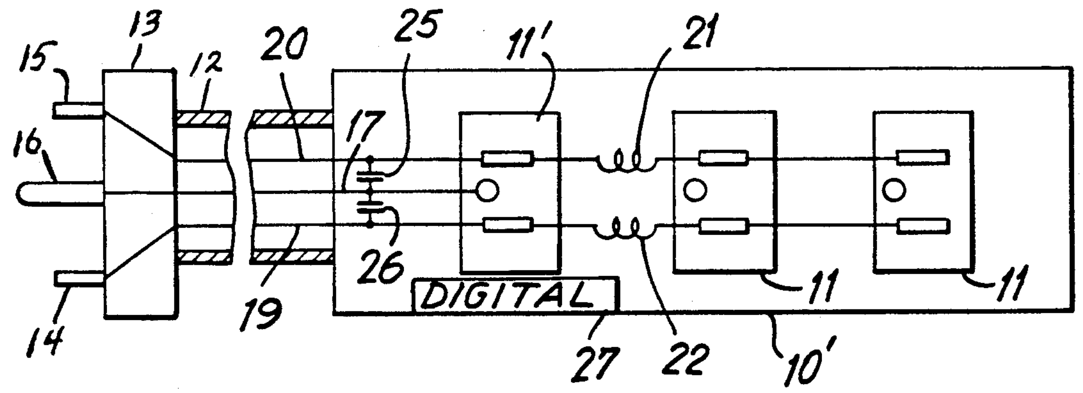
FIG. 2 is a schematic representation of a power strip in accordance with the invention.

Referring now to FIG. 2 wherein like parts have been assigned like reference numbers, housing 10' includes a receptacle 11' bearing digital label 27 and other receptacles 11. It is intended that any device having a digital switching circuit be powered from receptacle 11' and that all other components of the same audio or video circuitry be powered from receptacles 11.

Capacitors 25, 26 are connected between mains leads 20 and ground 17 and 19 and ground 17 as before. In this circuitry inductances 21, 22 are installed downstream of the digital receptacle 11', i.e. between receptacle 11' and the corresponding contacts of receptacles 11. In addition, neither of the receptacles 11 is connected to the ground lead 17.

As will be apparent from a review of FIG. 2, digital noise (high frequency products, etc.) generated by an appliance installed in receptacle 11' is shunted to ground via capacitors 25, 26, such components being isolated from receptacles 11 by inductors 21, 22 (it being permissible, in addition, to add a shunting capacitor across the contacts of receptacles 11).

It will thus be apparent that the receptacles 11 are effectively isolated not only from high frequency products in the mains but they are also isolated from high frequency products generated by the apparatus powered by receptacle 11'.

Desirably all components other than digital should be powered from receptacles 11 rather than directly from the mains, to secure maximum isolation.

Without limitation and by way of compliance with the best mode requirements of the patent laws, the value of the capacitors may be about 0.1 mfd and the value of the inductances about 100 microhenry. Desirably the capacitors should have a working voltage substantially higher than any likely to be encountered in use and should be high quality, i.e. polypropylene.

The inductors, of course, should offer minimum ohmic resistance and should be able to carry the currents anticipated in use.

There is provided in accordance with the invention a power strip for use in high definition audio and video systems which provides a low impedance path for both mains generated and system generated high frequency products and maximum isolation for non-digital elements of the system. Tests of the device have been found materially to improve the reproduced sound and the definition of picture in the audio and video systems in which they are employed.

Having thus described the invention and illustrated its use, what is claimed as new and is desired to be secured by Letters Patent is:

1.—An A C power strip for use with a high accuracy audio or video system which includes a source incorporating digital switching, comprising a housing having a plurality of power outlet receptacles, a mains line extending from said housing and including a live, a neutral, and a ground lead, one said receptacle including ground, live and neutral contacts, said ground contact being coupled to said ground lead, capacitor means in the series connection between said live and neutral contacts respectively, and said ground contact for shunting to ground high frequency products, indicia means on said strip for designating said one receptacle as a digital receptacle, the others of said receptacles having live and neutral contacts, inductor means in series connection between said live and neutural contacts of said one receptacle and said live and neutral contacts, respectively, of said other receptacles, said other receptacles being isolated from said ground lead.

2.—A power strip in accordance with claim 1 wherein said capacitor means have a value of about 0.1 mfd and said inductance means a value of about 100 microhenry.

* * * * *